United States Patent [19]
Mueller

[11] Patent Number: 5,453,984
[45] Date of Patent: Sep. 26, 1995

[54] COMMUNICATION SYSTEM FOR MULTI-SERVICE COMMUNICATION TERMINAL EQUIPMENT IN LOCAL NETWORKS

[75] Inventor: Henrik Mueller, Munich, Germany

[73] Assignee: Siemens Aktiengesellschaft, Munich, Germany

[21] Appl. No.: 78,042

[22] Filed: Jun. 18, 1993

[30] Foreign Application Priority Data

Jun. 30, 1992 [DE] Germany ............... 42 21 474.2

[51] Int. Cl.$^6$ ................................................. H04J 3/02
[52] U.S. Cl. ...................... 370/85.13; 370/110.1
[58] Field of Search .................. 370/58.1, 60, 60.1, 370/110.1, 85.13, 94.1, 71, 99, 85.14, 85.9; 379/219, 220, 402, 225, 224, 229, 235, 240, 399

[56] References Cited

U.S. PATENT DOCUMENTS

| | | | |
|---|---|---|---|
| 4,549,291 | 10/1985 | Renoulin et al. | 370/60.1 |
| 4,715,026 | 12/1989 | Eberspaecher | 370/60 |
| 4,965,790 | 10/1990 | Nishino et al. | 370/110.1 |
| 4,970,721 | 11/1990 | Aczel et al. | 370/58.1 |
| 5,058,111 | 10/1991 | Kihara et al. | 370/60 |
| 5,093,825 | 3/1992 | Helsmoortel et al. | 370/58.2 |
| 5,208,811 | 5/1993 | Kashio et al. | 370/94.1 |

FOREIGN PATENT DOCUMENTS 0347644  12/1989  European Pat. Off. .

OTHER PUBLICATIONS

Gustav Laub, "ISDN Systems: Architecture, Technology, and Applications" 1990, Chapter 6, pp. 215–217.
CCITT recommendations I.420, I.421, "Application of I–Series Recommendations to ISDN User–Network Interfaces", Malaga–Torremolinos, 1984, Section 2.
CCITT recommendations I.430, "ISDN User–Network Interfaces", Melbourne, 1988, Section 3.
CCITT recommendation I.431, "Primary Rate User–Network Interface–Layer 1 Specification", Melbourne, 1988.
CCITT recommendations I.450, I.451, I.452, I.440, I.441, "ISDN User–Network Interfaces": Layer 3 Recommendations; Melbourne 1988; Section 5.

*Primary Examiner*—Benedict V. Safourek
*Assistant Examiner*—Huy D. Vu
*Attorney, Agent, or Firm*—Hill, Steadman & Simpson

[57] ABSTRACT

Communication system for multi-service communication terminal equipment in local networks. A local network in which communication terminal equipment (KE; "multi media" communication terminal equipment) additionally having narrow-band and telephone services (SB, FE) are provided in addition to network-specific services is connected via an interworking unit (APE) to subscriber line interfaces (TAS) of a communication system (KA) having narrow band and telephone communication functions (SB, FE). As a result of the insertion of an interworking unit (APE) equipped with subscriber equipment (TLE), a matching unit (AE) and an access means (LANZ) onto the local network (LAN), the functions of both networks (narrow band and telephone network and local network LAN) are preserved largely unmodified and a maximally possible modularity and flexibility given the least additional outlay are achieved in structuring and formatting communication systems with "multi media" communication terminal equipment.

20 Claims, 1 Drawing Sheet

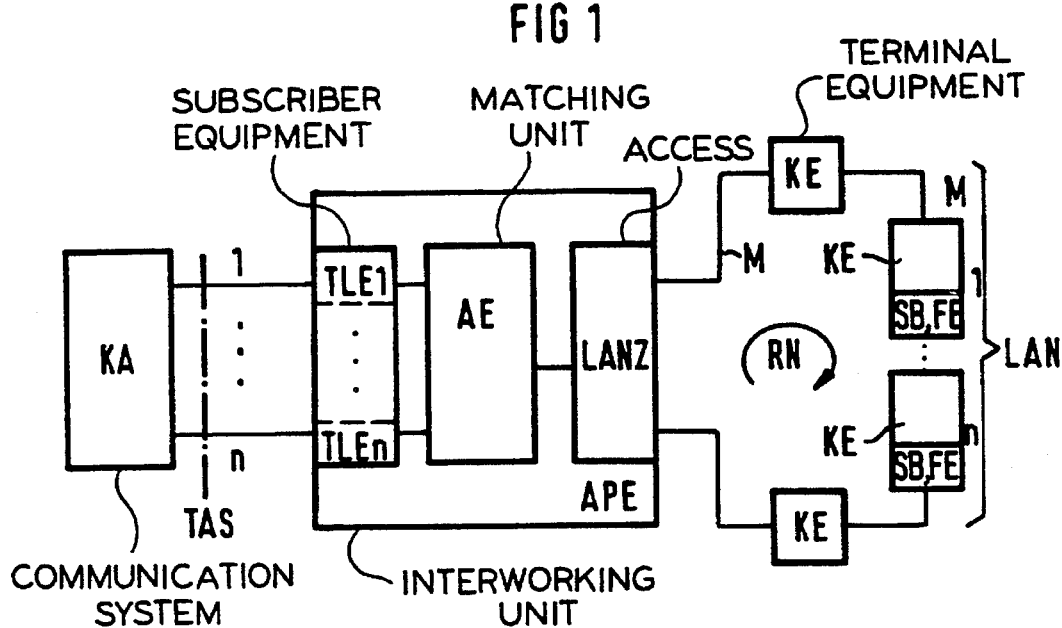
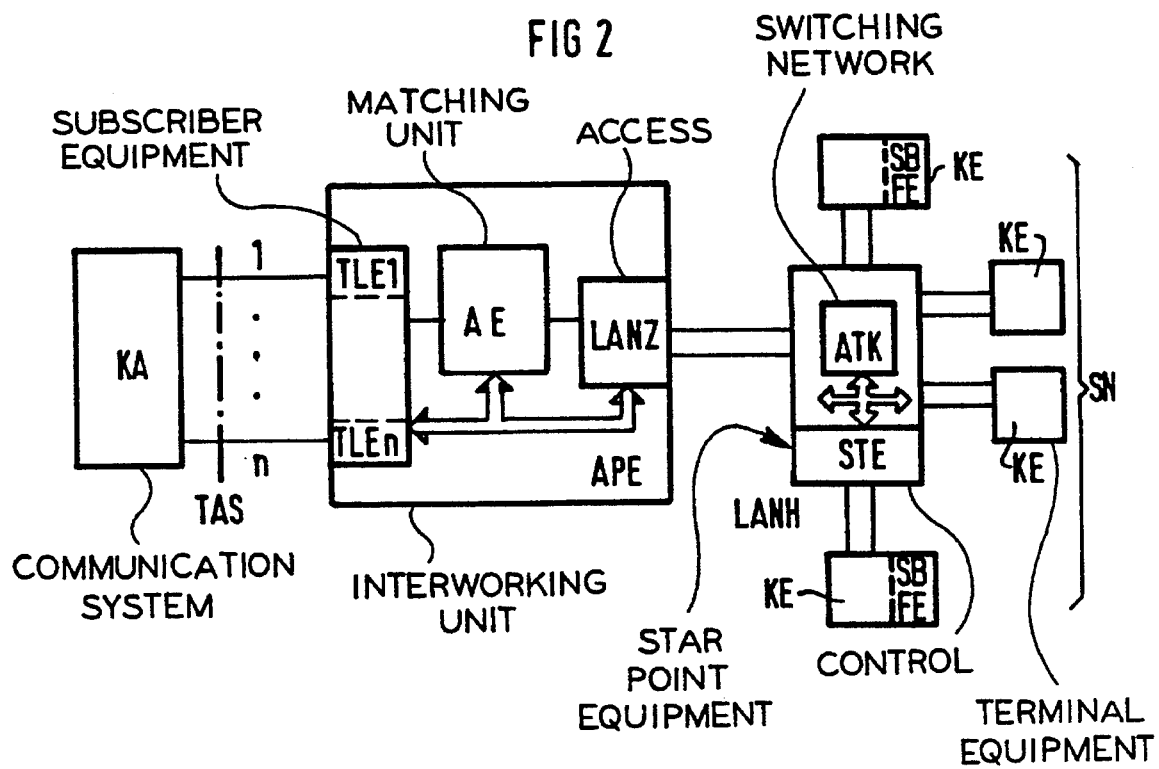

COMMUNICATION SYSTEM FOR MULTI-SERVICE COMMUNICATION TERMINAL EQUIPMENT IN LOCAL NETWORKS

BACKGROUND OF THE INVENTION

Communication terminal equipment that are equipped with a plurality of communication services or communication functions are being increasingly provided in communication networks. Such equipment is known in the technical field as "multi media" communication terminal equipment or multi-service communication terminal equipment, such as, for example, computer-controlled terminal equipment that are connected to local networks. Such communication terminal equipment is realized, for example, by "work stations" that communicate with one another via local networks. The local networks are predominantly formed by known ring-shaped networks, bus networks and combinations of ring-shaped networks and bus networks. The "token passing" method in ring-shaped networks and the CSMA/CD (carrier sense multiple access with collision detection) method in bus-shaped networks are usually provided as access procedures to the transport function of the local networks. The signalling and transport functions for these access procedures, as well as, the physical properties of the access equipment are standardized for ring-shaped networks and bus networks in ANSI/IEEE standards 802.3 through 802.6.

In the implementation of known narrow-band and telephone communication functions (for example, telephoning, facsimile, video text and other 64 kbit/s services) in addition to the functions and services in the respective local network, the known signalling methods must be observed in "multi media" communication terminal equipment. Since signalling and transmission procedures in "multi media" communication terminal equipment are predominantly intended for services in local networks, additional signalling and communication functions must be realized for narrow band and telephone communication services. In particular, such realizations require a considerable additional program outlay in the equipment of the local networks.

SUMMARY OF THE INVENTION

It is an object of the present invention to integrate narrow band or telephone communication functions with optimally low, additional network outlay in communication terminal equipment of local networks.

In general terms the present invention is a communication arrangement having communication terminal equipment that are connectable to a local network and that at least partially have narrow band and telephone communication functions. A communication system that controls or influences narrow band and telephone communication functions has subscriber line interfaces. An interworking unit is arranged between the local network and the communication system. The interworking unit is connected to the local network via an access means and is connected to subscriber line interfaces of the communication system via subscriber equipment. A subscriber line interface is arranged between the interworking unit and the communication system for every communication terminal equipment of the local network that has narrow band and telephone communication functions. The interworking unit has a matching unit that is fashioned such that signalling and message information communicated from the communication terminal equipment or from the communication system for the purpose of call control of narrow band and telephone communication connections is matched to the signalling procedures or message formats of the communication system or of the local network, respectively. The communication system is fashioned such that the narrow band and telephone communication connections of the communication terminal equipment of the local network to one another and/or to further communication terminal equipment of the communication system are controlled by the communication system for the purpose of a call set up and clear down and/or are influenced by the communication system for the purpose of additional performance feature controls.

An important aspect of the communication system of the present invention is that a communication system for the realization of the signalling and exchange functions for narrow band and telephone communication functions or services is involved on the basis of an interworking unit. As a result thereof, the local network need only offer the transport functions for these functions or services.

One advantage of the communication system of the present invention is that the functions of both networks, i.e. those of the local network and those of the narrow band and telephone network, remain largely unmodified due to the use of the interworking unit. Thus, a substantial modularity is achieved in the structuring and formatting of communication systems with "multi media" communication terminal equipment. In particular, the advantageous provision of subscriber performance features preferably provided in private communication networks is preserved for narrow band and telephone services without considerable added outlay in the local network.

The subscriber line location is especially advantageously formed by a digital individual or multiplex subscriber line interface. Given such "digital" subscriber line interfaces, the signalling information and message information are separately transmitted in a signalling channel and in a message channel. The signalling information that controls the call set-up or clear down, as well as, the subscriber performance features is thereby predominantly communicated packet-oriented. The digital information or messages representing digitized voice signals are thereby communicated in the message channel, usually with a bit rate of 64 kbit/s. The subscriber line interface advantageously has one or two message channels and one signalling channel (individual subscriber terminal interface) or a plurality of message channels (usually 30 or 24) and a signalling channel (multiplex subscriber line terminal). A digital subscriber line interface is especially advantageously realized by a subscriber line interface of a standardized integrated services digital network. This network is known as an ISDN network (integrated services digital network) in the technical field. The procedural and physical properties of these ISDN subscriber line interfaces are set down in the recommendations of the CCITT (International Telegraph and Telephone Consultative Committee) of the I and Q series. The ISDN subscriber line interfaces are particularly described in CCITT Recommendations I.420 and I.421. Given a realization of the subscriber line interface according to CCITT Recommendation I.420, this can be formed by a S or T interface according to the S and T reference points. Further, even more economical manufacturer-specific U-subscriber line interfaces are in use, these being particularly adapted to the distances of the communication terminal equipment from the communication system that are standard in the subscriber line region of private communication systems.

According to other advantageous developments of the communication system of the present invention, the local networks are realized by a ring-shaped network having a standardized "token" access procedure or by a bus network having a random access procedure, known as CSMA/CD procedure (carrier sense multiple access with collision detection). The bus networks are thereby predominantly designed according to the International ANSI/IEEE Standard 802.3 and the ring-shaped networks are predominantly designed according to the ANSI/IEEE Standard 802.5 as well as 802.6.

According to an additional, advantageous development of the communication system of the present invention, the local network is realized by a star-shaped network, whereby a packet-oriented switching network is arranged in the star point of the local network for the purpose of a switching-oriented control of the messages to be communicated to the communication terminal equipment. Switching networks have recently been disclosed for such "intelligent" star point equipment whose switching principles are based on the ATM (asynchronous transfer mode) packet switching technique. This ATM packeting switching technique is suitable both for the communication and transmission of digitized voice information as well as digital information. For example, the messages to be communicated according to a ring-shaped network can be directly communicated to the addressed communication terminal equipment via the respective transmission medium while bypassing the unaffected communication terminal equipment using the intelligent star point equipment. As a result thereof, a fast transmission of the messages and an especially effective usage of the existing transmission capacity can be achieved.

A further advantageous development of the communication system of the present invention is the provision of a means for chronological matching message information that is communicated packet-oriented in the local network to the isochronic switching or processing of the message information in the matching equipment or in the communication terminal equipment. This means is provided in the interworking unit or in the communication terminal equipment. The means is formed by clock-controlled memory means, whereby the size of the memory means as well as the packet length of the message or signalling information communicated in the local network are matched to one another taking the extent of the local network into consideration. The packet length is to be defined dependent on the extent of the local network, whereby the overall delay time that is caused by the packet-oriented switching of the narrow band or telephone information, respectively, in the local network must not effect any perceptible disturbances in the narrow band or telephone communication connections.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 is a block diagram of a communication system wherein a matching unit is inserted between a local, ring-shaped network and a communication system; and FIG. 2 is a block diagram of a communication system wherein a matching unit is inserted between a local, star-shaped network and a communication system.

DESCRIPTION OF THE PREFERRED EMBODIMENT

FIG. 1 shows an interworking unit APE to which a communication system KA having narrow band or telephone functions and a local network LAN are connected. A communication system KA for narrow band and telephone functions or services is disclosed, for example, by the published European Patent Application 0 347 644 A1 (corresponding to U.S. Pat. No. 5,093,825 issued Mar. 3, 1992 and hereby incorporated by reference). For the connection of narrow band and telephone subscriber terminal equipment, the communication system KA has subscriber line interfaces TAS, whereby n of these subscriber line interfaces TAS are connected to n subscriber equipment TLE1 . . . TLEn of the interworking unit APE. For example, the subscriber line interfaces TAS have two message channels of 64 kbit/s provided in digital communication networks for the communication of, in particular, digitized voice information and have a signalling channel of, for example, 16 kbit/s. The signalling information, for example, is communicated according to the Internationally standardized D-channel protocol in digital communication networks. The network termination functions known from the digital ISDN communication networks are essentially realized in the subscriber equipment TLE1 . . . TLEn. The subscriber line interfaces TAS can also be realized as a primary multiplex interface having, for example, a transmission rate of 2.048 Mbit/s. In this case, this primary multiplex interface has 30 message channels and one signalling channel. A signalling channel having a bit rate of 64 kbit/s is preferably used for the exchange of signalling information for the 30 message channels. For example, the CCITT standardized E-signalling channel according to CCITT Recommendation I.450 is provided for this purpose for the connection handler. Given employment of a primary multiplex interface, the individual subscriber equipment TLE1 . . . TLEn can be eliminated and the bit stream can be communicated to a following matching unit AE either directly or via a transmission-oriented transmission and reception means. Given connection of n subscriber line interfaces TAS, the signalling or message information received from the subscriber equipment TLE1 . . . TLEn is respectively forwarded to the matching unit AE. Given the presence of S or T interfaces of the ISDN basic access (for example, $S_0$,) as subscriber line interfaces TAS of the communication system, the subscriber equipment TLE1 . . . TLEn can likewise be omitted and the signalling or message information can be conducted directly to the matching unit AE.

The matching unit AE is connected to an access means LANZ for the local network LAN. Let it be assumed for the exemplary embodiment that the local network LAN is realized by a ring-shaped network. The communication terminal equipment KE as well as the access means LANZ are thereby connected following one another in a ring configuration by transmission media M. The transmission medium M, for example, is realized by metallic lines or by light waveguide systems. The communication terminal equipment KE of the ring-shaped network RN are, for example, personal computers (work stations) having access means for the ring-shaped network RN or are "multi media" communication terminal equipment KE.

Given these "multi media" or multifunctional communication terminal equipment KE, additional services for narrow band or telephone function SB, FE are provided in addition to the data transmission services offered in local networks. Narrow band services are represented, for example, by picture screen text service or facsimile service. Let it be assumed for the exemplary embodiment that the physical and procedural properties of the ring-shaped network RN correspond to the International ANSI/IEEE Standard 802.5. The "token passing" access procedure is thereby applied as the access procedure on the transmission capacity of the ring-shaped network IN. The access equipment of the communication terminal equipment KE of the ring-shaped network as well as the access means LADZ in the interworking unit APE meet the procedural and physical conditions of the ANSI/IEEE Standard 802.5.

The signalling information communicated via the ring-shaped network RN by the communication terminal equipment KE having narrow band or telephone functions SB, FE is evaluated, potentially adapted in the matching unit AE and forwarded together with the communicated message information to the subscriber line interface TAS of the communication system KA that is allocated to the respective communication terminal equipment KE. Analogous thereto, the signalling information communicated from the communication system KA is matched to the ring network-specific signalling procedures and forwarded together with the communicated message information to the ring-shaped network Rn or to the respective communication terminal equipment KE via the access means LANZ. A subscriber line interface TAS is thereby allocated to every communication terminal equipment KE having narrow band or telephone communication functions SB, FE.

The signalling and message information for the narrow band or telephone communication services can be formed in the appertaining communication terminal equipment KE of the ring-shaped network RN in conformity with the communication system and can be communicated to the interworking unit APE on the basis of relatively slight, additional program-oriented outlay using the transport function of the ring-shaped network RN. The ring network-associated, usually packet-oriented signalling procedure information is removed in the matching unit AE of the interworking unit APE and forwarded to the communication system KA. Signalling and message information communicated from the communication system KA is matched to the ring network-associated communication procedure and designationally transmitted to the appertaining communication terminal equipment KE. As a result of the insertion of the interworking means APE, a maximum degree of flexibility and modularity is achieved in the structuring of communication networks wherein what are referred to as "multi media" communication terminal equipment or multifunctional communication terminal equipment KE having narrow band or telephone communication functions SB, FE are arranged in local networks. Further, the interworking means APE effects a transition to public or private communication networks for communication terminal equipment KE having narrow band and telephone functions SB, FE that are arranged in local networks LAN, as a result whereof further, so-called "gateway" and "bridge" equipment are avoided.

FIG. 2 shows an interworking unit APE to which is connected via subscriber line interfaces TAS a communication system KA designed in conformity with FIG. 1 and, differing from FIG. 1, a local network LAN realized as a star network SN. In addition to communication terminal equipment KE having the star network communication functions, "multi media" communication terminal equipment KE, i.e., communication terminal equipment KE having narrow band and telephone communication functions SB, FE, are additionally arranged in this star network SN. Let it be assumed for the exemplary embodiment that narrow band and telephone services SB, FE according to FIG. 1 are implemented in the "multi media" communication terminal equipment KE.

The communication terminal equipment KE of the star network SN as well as an access means LANZ arranged in the interworking unit APE are connected star-like to a star point equipment LANH. Let it be assumed for the exemplary embodiment that the signalling and message information are communicated between the communication terminal equipment KE via the star point equipment LANH by packet-oriented message, for example in the ATM (asynchronous transfer mode) packet switching mode. By evaluating the communicated signalling information with a control means STE arranged in the star point equipment LANH, the message information allocated to the signalling information can be communicated by a switching network ATK to the addressed communication terminal equipment KE or access equipment LANZ via the respective transmission media. The switching network that can be influenced by the control means STE is designed, for example, according to the ATM packet transmission technique.

Analogous to FIG. 1, the signalling or message information appertaining to the narrow band and telephone communication services SB, FE is formed in conformity with the communication system and communicated to a matching unit AE arranged in the interworking unit APE via the network access means LANZ that is equipped with corresponding transmission and reception packet switching technology. The signalling and transmission frames associated with the star network are removed or adapted in this matching unit AE and the remaining signalling and message information conforming to the communication system is communicated to the communication system KA via subscriber equipment TLE1 . . . TLEn connected to the subscriber line interfaces TAS. Analogous thereto, the signalling and message information communicated from the communication system KA is converted in the matching unit AE into information in conformity with ATM or a star network and communicated to the respective communication terminal equipment KE via the star point equipment LANH. A maximum degree of flexibility and modularity is thereby also achieved for the design of communication networks with what are referred to as "multi media" communication terminal equipment KE in local networks LAN.

Alternatively, the signalling or message information, respectively, for narrow band and telephone services SB, FE can be formed in the communication terminal equipment KE according to the procedures and communication information of the local, ring-shaped network or star network SN and can be communicated to the interworking unit APE. However, extensive matching or conversion functions particularly in view of the signalling matching must be provided for this purpose in the matching unit AE.

Instead of the ring network Rn or the star network SN, a local bus network (not shown) can also be connected to the interworking unit APE. However, an access means LANZ adapted to the local bus network must thereby be provided and a handling routine for the protocols or signalling of the likewise packet-oriented bus network must be integrated in the matching unit AE.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication arrangement having communication terminal equipment that are connected to a local network, at least one of the communication terminal equipment having narrow band and telephone communication functions, comprising:

a communication system that controls and influences narrow band and telephone communication functions and that has subscriber line interfaces;

interworking unit connected between the local network and the communication system, said interworking unit being connected to the local network via an access apparatus and being connected to subscriber line interfaces of the communication system via subscriber equipment, a subscriber line interface being arranged between the interworking unit and the communication system for every communication terminal equipment of the local network that has narrow band and telephone communication functions;

the interworking unit having a matching unit for matching signalling and message information communicated from a communication terminal equipment of the local networks or from the communication system for call control of narrow band and telephone communication connections to signalling procedures and message formats of the communication system and the local network, respectively; and the communication system being structured such that narrow band and telephone communication connections of the communication terminal equipment of the local network are switched to other communication terminal equipment of the local network and the communication system and are influenced for controlling performance features in the communication system.

2. The communication arrangement according to claim 1, wherein at least one of a respective subscriber line interface in the communication system and an access apparatus in the interworking unit is formed by a digital individual or multiplex subscriber line interface.

3. The communication arrangement according to claim 1, wherein the subscriber line interface is a subscriber line interface of a standardized, integrated services network.

4. The communication arrangement according to claim 1, wherein the local network is a ring-shaped network having a standardized token passing access procedure.

5. The communication arrangement according to claim 1, wherein the local network is a bus network having random access procedures.

6. The communication arrangement according to claim 1, wherein the local network is a star-shaped network, whereby packet-oriented switching networks are arranged in a star point of the local network for switching-oriented control of messages to be communicated.

7. The communication arrangement according to claim 1, wherein the interworking unit has means for chronologically matching message information communicated packet-oriented in the local network to isochronic switching or processing of the message information.

8. The communication arrangement according to claim 7, wherein the means for chronological matching is a clock-controlled memory means, whereby a size of the memory means, as well as a packet length of a message or signalling information communicated in the local network are matched to one another, taking an extent of the local network into consideration.

9. The communication arrangement according to claim 1, wherein the communication terminal equipment has means for chronologically matching message information communicated packet-oriented in the local network to isochronic switching or processing of the message information.

10. The communication arrangement according to claim 9, wherein the means for chronological matching is a clock-controlled memory means, whereby a size of the memory means, as well as a packet length of a message or signalling information communicated in the local network are matched to one another, taking an extent of the local network into consideration.

11. A communication arrangement, comprising:

a local network having a plurality of communication terminal equipment, at least one of the plurality of communication terminal equipment having narrow band and telephone communication functions;

a communication system that utilizes narrow band and telephone communication function sand that has subscriber line interfaces;

an interworking unit connected between the local network and the communication system, said interworking unit being connected to the local network via an access and being connected to the subscriber line interfaces of the communication system via subscriber equipment, whereby a subscriber line interface is arranged between the interworking unit and the communication system for every communication terminal equipment of the local network that has narrow band and telephone communication functions; and the interworking unit having a matching unit that matches signalling and message information from the communication terminal equipment, or respectively, from the communication system, for call control of narrow band and telephone communication connections, to signalling procedures and message formats, respectively, of the communication system and the local network, respectively;

wherein the communication system is structured such that narrow band and telephone communication connections of the communication terminal equipment of the local network are switched to other communication terminal equipment of the local network and the communication system and are influenced for controlling performance features in the communication system.

12. The communication arrangement according to claim 11, wherein at least one of a respective subscriber line interface in the communication system and an access apparatus in the interworking unit is formed by a digital individual or multiplex subscriber line interface.

13. The communication arrangement according to claim 11, wherein the subscriber line interface is a subscriber line interface of a standardized, integrated services network.

14. The communication arrangement according to claim 11, wherein the local network is a ring-shaped network having a standardized token passing access procedure.

15. The communication arrangement according to claim 11, wherein the local network is a bus network having random access procedures.

16. The communication arrangement according to claim 11, wherein the local network is a star-shaped network, whereby packet-oriented switching networks are arranged in a star point of the local network for switching-oriented control of messages to be communicated.

17. The communication arrangement according to claim 11, wherein the interworking unit has means for chronologically matching message information communicated packet-oriented in the local network to isochronic switching or processing of the message information.

18. The communication arrangement according to claim 17, wherein the means for chronological matching is a clock-controlled memory means, whereby a size of the memory means, as well as a packet length of a message or signalling information communicated in the local network are matched to one another, taking an extent of the local network into consideration.

19. The communication arrangement according to claim 17, wherein the communication terminal equipment has means for chronologically matching message information communicated packet-oriented in the local network to isochronic switching or processing of the message information.

20. The communication arrangement according to claim 19, wherein the means for chronological matching is a clock-controlled memory means, whereby a size of the memory means, as well as a packet length of a message or signalling information communicated in the local network are matched to one another, taking an extent of the local network into consideration.

* * * * *